Sept. 3, 1929.  S. A. FARRELL  1,727,232
FLEXIBLE MECHANICAL POWER TRANSMISSION
Filed Feb. 3, 1928  4 Sheets-Sheet 1

WITNESSES
William P. Goebel
Franklin Foster

INVENTOR
Stephen A. Farrell
BY
ATTORNEY

Sept. 3, 1929.     S. A. FARRELL     1,727,232
FLEXIBLE MECHANICAL POWER TRANSMISSION
Filed Feb. 3, 1928     4 Sheets-Sheet 2

WITNESSES
William P. Goebel.
Franklin J. Foster

INVENTOR
Stephen A. Farrell
BY
[signature]
ATTORNEY

Sept. 3, 1929.  S. A. FARRELL  1,727,232
FLEXIBLE MECHANICAL POWER TRANSMISSION
Filed Feb. 3, 1928   4 Sheets-Sheet 3
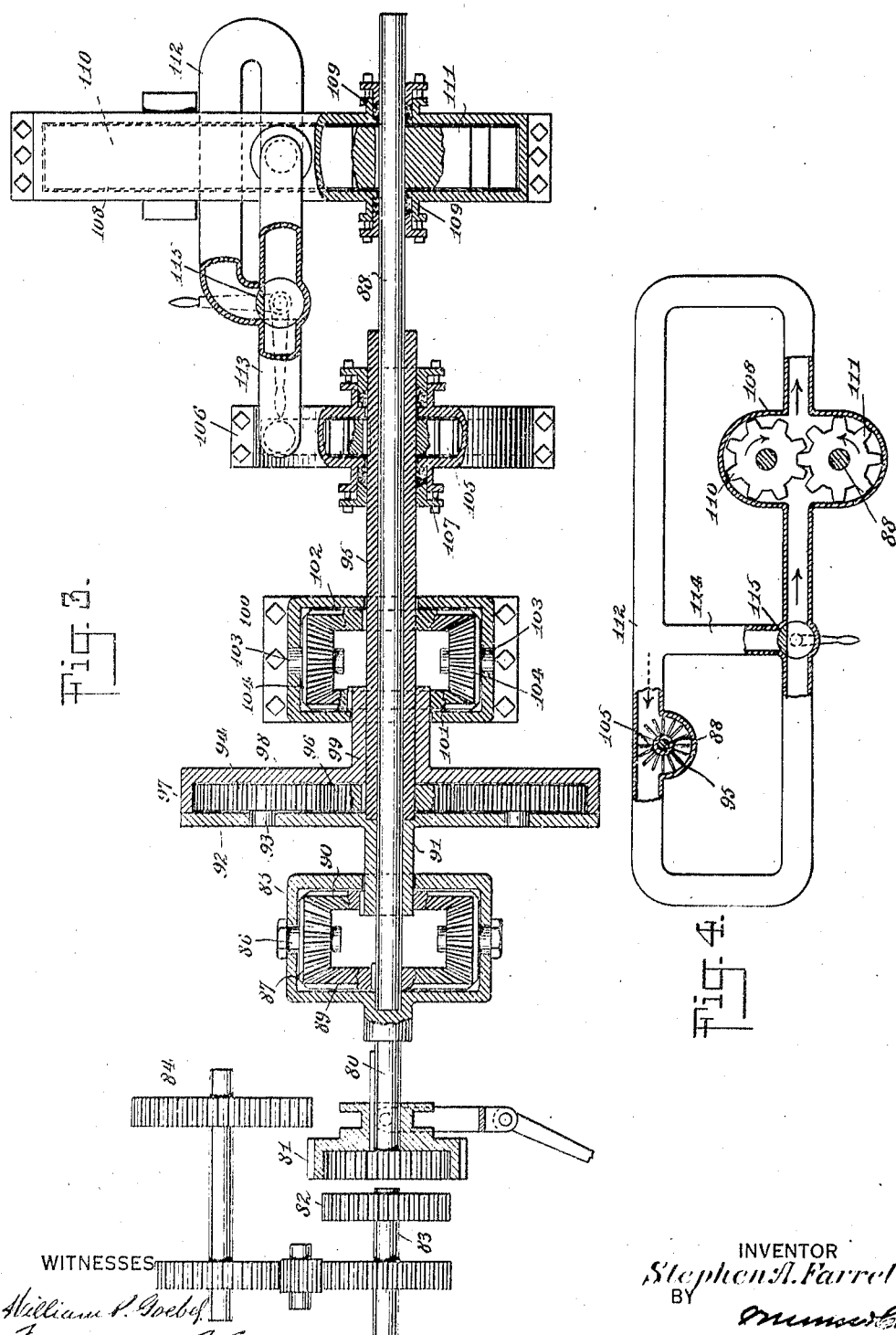
INVENTOR
Stephen A. Farrell
BY
ATTORNEY

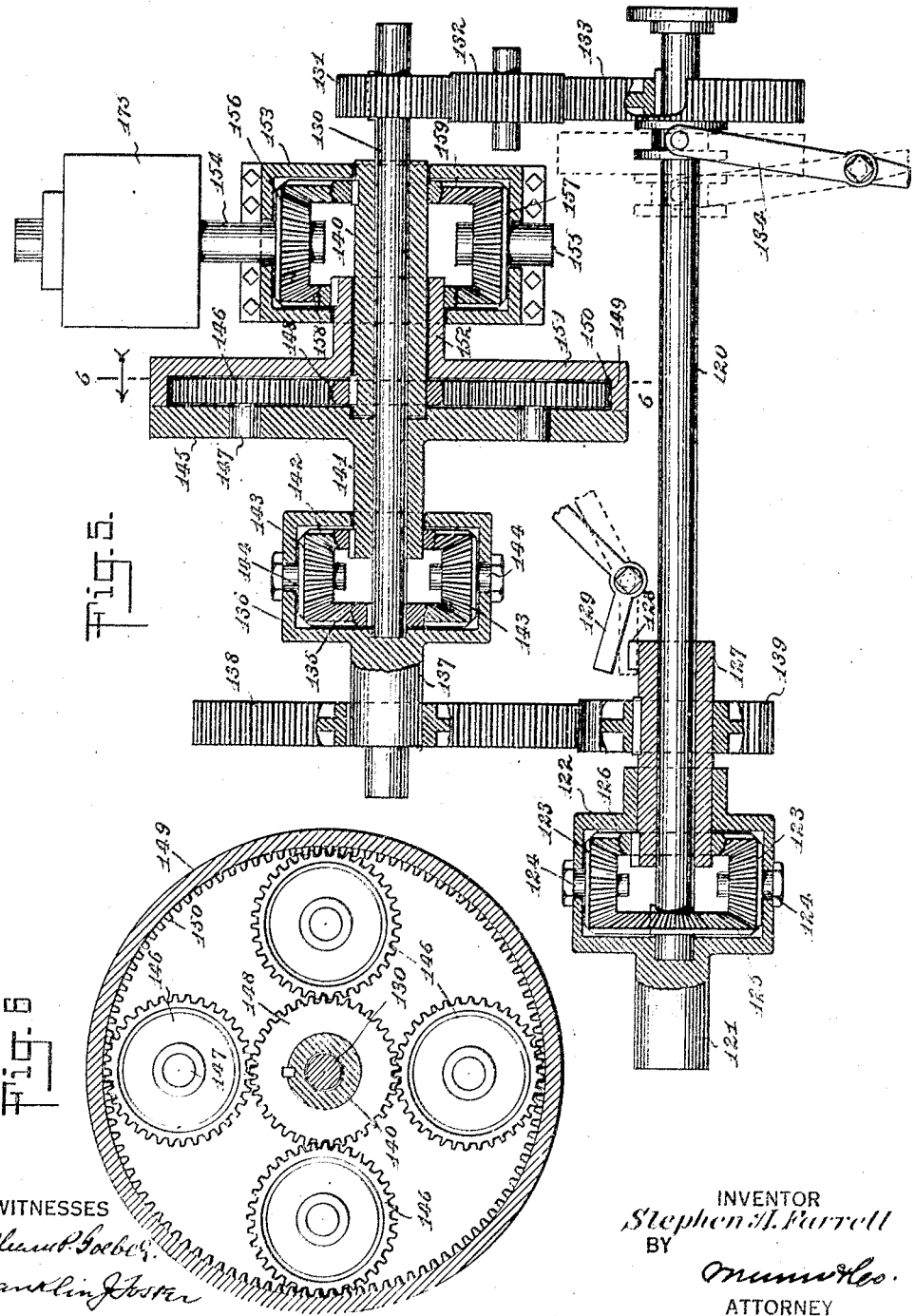

Patented Sept. 3, 1929.

1,727,232

UNITED STATES PATENT OFFICE.

STEPHEN A. FARRELL, OF BROOKLYN, NEW YORK.

FLEXIBLE MECHANICAL POWER TRANSMISSION.

Application filed February 3, 1928. Serial No. 251,634.

The present invention is concerned with the provision of an improved power transmitting mechanism of the character which is inserted between a prime mover and a load, and is a continuation in part of my copending application Serial No. 154,520, filed December 13, 1926.

The transmission may have a wide range of utility, being useful for driving various types of land and marine vehicles, driving machine tools and pointing guns.

The transmission is primarily intended as a gear for transmitting without lag the power generated by a constant torque prime mover, such for instance as the steam turbine or internal combustion engine, and in some cases (such as gun pointing), the electric motor.

The invention finds numerous mechanical embodiments, several of which are illustrated in the present application.

Inasmuch as the various embodiments of the invention while having certain of the common objects noted above, are peculiarly adapted for special purposes and for driving special classes of vehicles or operating special classes of mechanism, I shall discuss the specific objects of each embodiment of the invention as such embodiment is taken up in the specification.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein—

Fig. 3 is a similar view illustrating a further modification.

Fig. 4 is a diagrammatic view of the hydraulic control mechanism used with the transmission of Fig. 3.

Fig. 5 is a view similar to Fig. 1, illustrating a further modification.

Fig. 6 is a transverse sectional view on the line 6—6 of Fig. 5.

All of the drawings are diagrammatic in that they omit the showing of bearings and supports, and show the manually operable gear shifting mechanism only diagrammatically.

Figure 1:
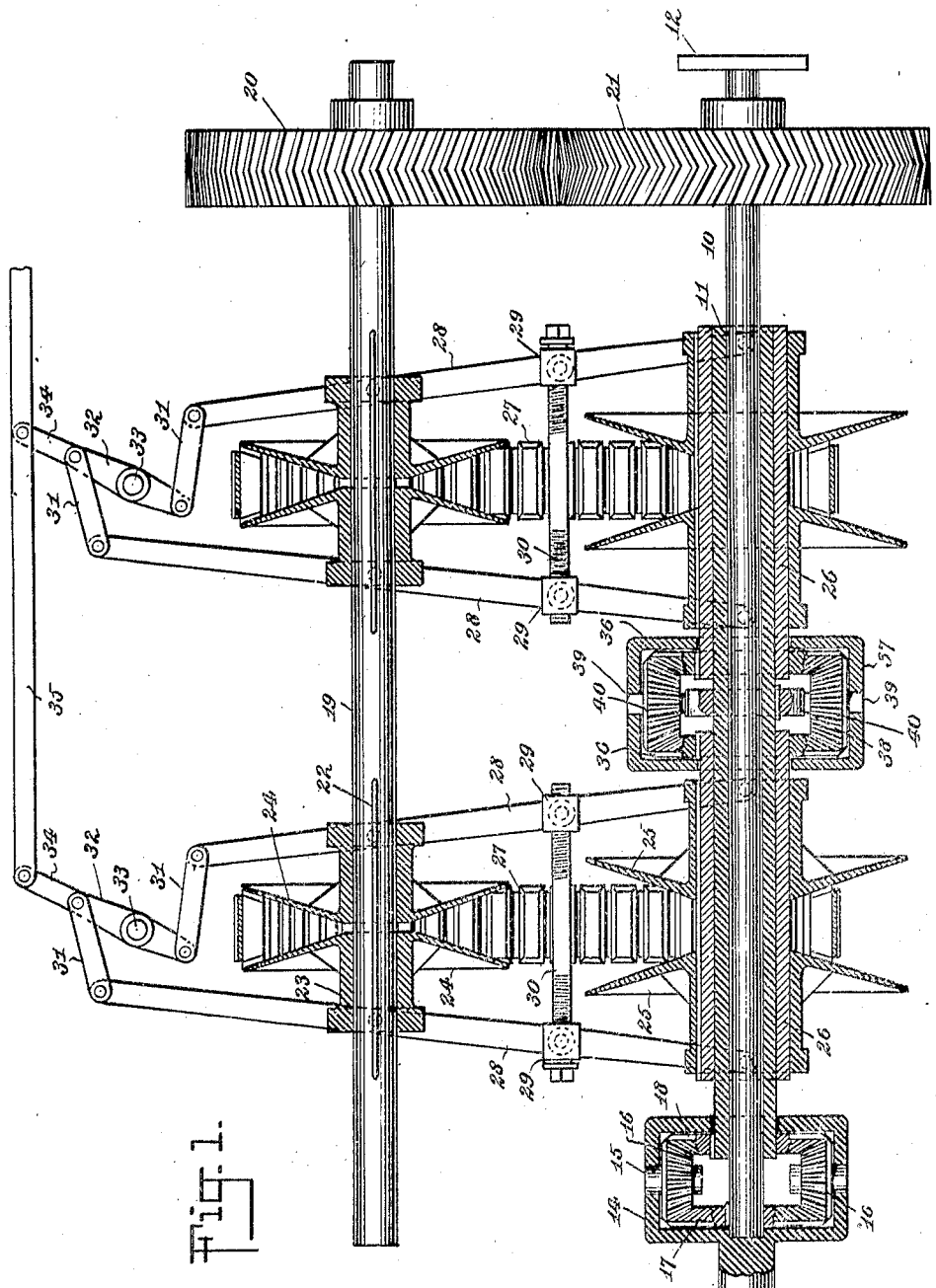
Fig. 1 is a sectional plan view of a transmission mechanism embodying the invention.

The transmission shown in Fig. 1 is primarily adapted for transmitting moderate loads, although the mechanism might possibly be used for transmitting loads as high as 1,000 H. P.

A feature of this form of invention is the use of a planetary speed reduction gear turning a drive shaft at a speed proportional to the speed differentials of a pair of nested driving shafts. One of the driving shafts is driven at a variable speed through adjustable belt mechanism from a counter shaft. The apparatus is unique in that two power transmitting belts may be utilized and means is provided for automatically compensating for any variation in the speed of the belts or in the belt adjustments.

Preferably the belts are of the wedge type confined between slidable pulley forming cones, so that by adjusting the cones, the speed ratio of the driving and driven pulleys may be varied.

Referring with particularity to Fig. 1 I have used the reference numerals 10 and 11 to designate a pair of nested driving shafts. One end of the shaft 10 is directly coupled as at 12 to a prime mover (not shown), the latter being preferably of the constant torque type. The driven shaft 13 is integral with a gear casing 14 mounting on pins 15 a pair of oppositely facing bevelled idler pinions 16 which serve as the planets of the reducing gear set. The oppositely facing sun gears 17 and 18 of the reducing set mesh with the pinions 16 and are fixed to the driving shafts 10 and 11 respectively.

Motion is indirectly imparted to the driving shaft 11 from the driving shaft 10 through the intermediacy of a variable speed mechanism which I shall now describe. The mechanism includes a counter shaft 19 preferably disposed in parallelism with the shafts 10 and 11 and carrying a gear 20 meshing with a smaller sized gear 21 on the shaft 10.

Keyed as at 22 on the counter shaft 19 are the hubs 23 of pulley-forming cones 24.

These cones define two sectional pulleys on the shaft 19. Similar cones 25 are keyed to sleeves 26 rotatable on the driven shaft 11. The pulleys 24 and 25 on the counter shaft and sleeves respectively are connected by the conventional wedge belts indicated at 27.

The cones 24 and 25 of each pulley set are adapted for relative separation or advance by manipulating levers. These levers indicated at 28 are fulcrumed at their intermediate portions on blocks 29; these blocks being adjustably mounted on the ends of a cross shaft member 30 disposed between the shafts 19 and 10. One end of each lever 28 is connected to the hubs of one of the lower cones 25. Each lever 28 near its upper end is connected to the hubs 23 of the upper cones 24. The extreme upper ends of the levers 28 are connected by links 31 to crank arms 32 on a crank shaft 33. The two crank shafts 33 are connected by links 34 to a common operating lever 35.

It will be apparent that movement of the lever 35 to the left from the position shown in Fig. 1 will tend to separate both sets of pulley forming cones 24 and effect relative advance of both sets of pulley forming cones 25, thereby changing the speed ratio between the counter shaft 19 and the sleeves 26.

Means is provided for compensating for differences in the speeds of the two driving belts 27. This compensating mechanism includes a pair of oppositely facing sun gears 36 arranged on the adjacent ends of the sleeves 26 and housed within a floating gear case 37. Such gear case floats relatively to the sleeves 26, but is rigidly connected to the shaft 11 by a hub 38 carrying diametrically opposite pins 39 which enter the gear case 37 and provide journals for freely rotatable idler gears 40 in mesh with the gears 36.

By virtue of this arrangement, if the belt pulleys of each set are accurately adjusted, and the belts consequently moving at the same speed to cooperatively transmit power from the shaft 19 to the sleeves 26, there will be no rotation of the idler gears 40, and the sleeves 26 with their gears 36 will cause the entire compensating planetary gear set to turn bodily with the shaft 11 and drive such shaft. When however, one belt falls behind the other, or one belt slips relatively to the other, the gears 40 serve to automatically compensate for the slippage.

It will be apparent from the foregoing description that if the shaft 10 is rotating at 600 R. P. M., and the belts are set to drive the sleeves 26 at 600 R. P. M., gears 17 and 18 will be oppositely rotating at the same speed and there will be no motion of the driven shaft 13; the gears 16 simply idling. When however, the belts are set to vary the speed between the gears 17 and 18, the driven shaft 13 will be turned either ahead or in reverse at R. P. M.'s equal to the difference in the R. P. M.'s of the gears 17 and 18. Thus, an absolutely flexible speed variation both ahead and in reverse may be had; this speed variation being limited only by the speed of the driving motor and the range of adjustment of the wedge belts.

Figure 2:
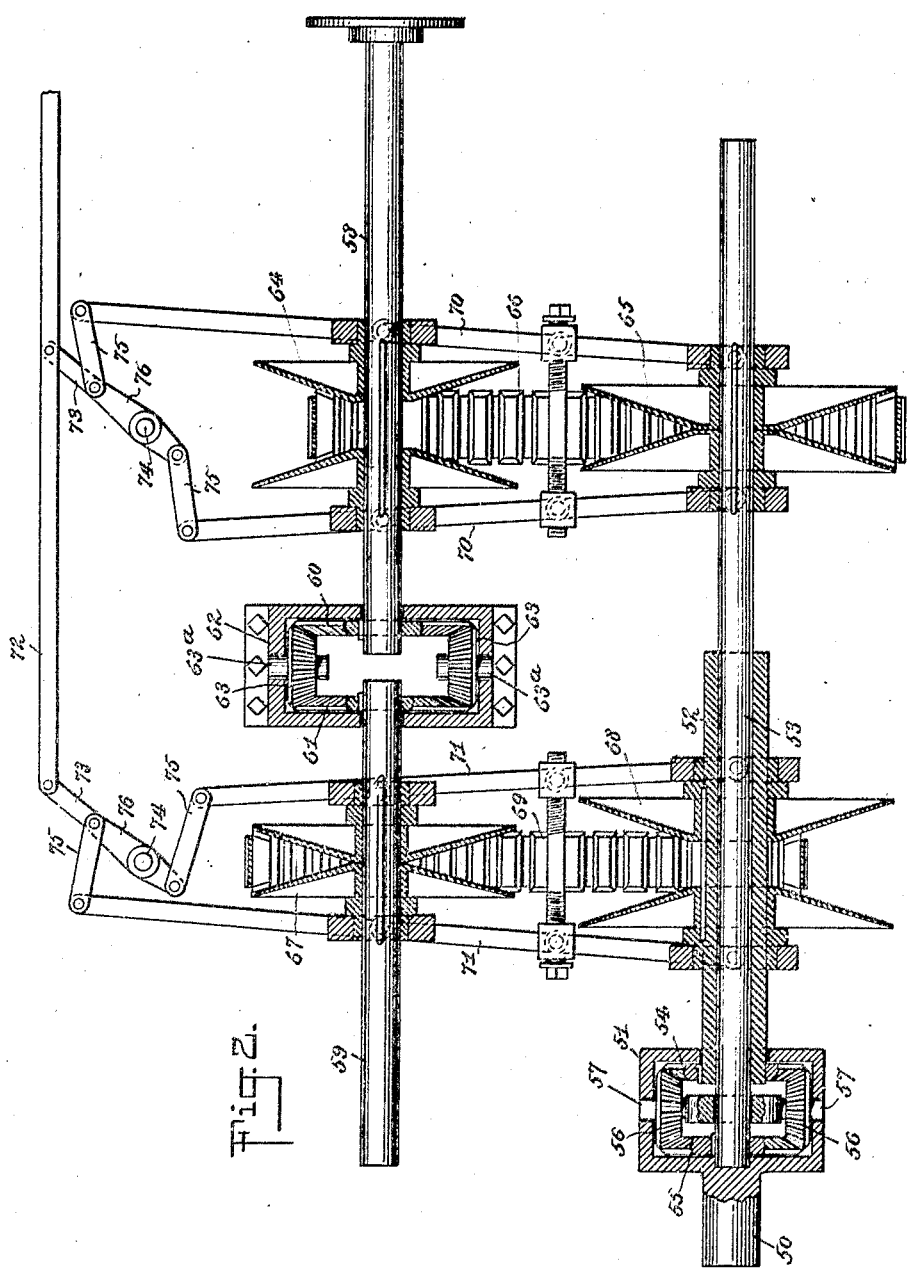
Fig. 2 is a similar view illustrating a modification.

In Fig. 2 I have illustrated a modified form of the invention peculiarly adapted for handling light loads, and also using wedge belts for power transmitting purposes. In this form of the invention, a pair of nested driving shafts again control through a planetary reduction gear the direction and speed of rotation of a driven shaft. In this form of the invention however, both of the driving shafts are operated through speed varying drive belts; one of the belts being driven directly from the prime mover shaft, and the other belt being driven from such shaft through a reversing gear.

Here again, means is provided for simultaneously adjusting the belt speeds, but the belt adjusting mechanism is arranged to simultaneously increase the speed of one driving shaft and decrease the speed of the other, whereby a wider range of flexibility is had. In this form of the invention 50 represents the driven shaft fixed to a gear case 51. The two nested driving shafts are designated at 52 and 53; these shafts carrying oppositely facing sun gears 54 and 55 respectively meshing with bevelled planetary idlers 56 journalled on pins 57 within the gear case 51.

The power shaft 58 of the prime mover is connected to an axially aligned counter shaft 59 through a gear set including bevelled gears 60 and 61 fixed to the shafts 58 and 59 respectively and mounted within a stationary gear casing 62. The gear 60 imparts motion to the gear 61 through a pair of bevelled idler pinions 63 mounted on stub shafts 63ª within the gear case 62. Thus, shaft 59 is driven by the shaft 58 at the same speed, but in a reverse direction through the reversing gears 60, 63, 61.

Adjustable pulleys 64 and 65 of the character described in connection with Fig. 1, are mounted on the shafts 58 and 53 and connected by a wedge belt 66. In like manner, pulleys 67 and 68 are mounted on the counter shaft 52, and connected by a wedge driving belt 69. Thus, the shaft 58 and counter shaft 59 drive the shafts 52 and 53 in opposite directions.

The pulley set 64, 65 is equipped with expanding and contracting levers 70 of the same character as the levers 28 of Fig. 1, and similar levers 71 are provided for the pulley set 67, 68. A common operating lever 72 carries cranks 73 acting on crank shafts 74, these shafts carrying crank arms 76 connected through link 75 to the upper ends of the levers 70 and 71. It will be noted that the arrangement of links and levers is such that movement of the levers 72 to the left tends to expand the pulleys 67 and contract the pulleys 64, thereby simultaneously decreasing the speed of the shaft 52 and increasing the speed of the shaft 53.

Inasmuch as the shafts 59 and 58 are geared for rotation at the same speed in opposite directions, a neutral position of the lever 72 will cause the shafts 52 and 53 to run at the same speed in opposite directions, and result in idling of the gears 56 without motion being imparted to the driven shaft 50. Movement of the lever 72 either to the right or left from this neutral position will cause movement of the driven shaft 50 either ahead or in reverse at a speed equal to one-half the difference in speeds of the driving shafts 52 and 53. Thus, this form of the invention also provides a mechanical flexible transmission peculiarly well suited to transmitting power from a constant torque motor without lag. The device while intended primarily for transmitting light or moderate loads, may be made in sufficiently large sizes to handle comparatively heavy loads, this factor being limited only by the ability of the belts to transmit power without slipping.

In Figs. 3 and 4 of the drawings I have shown a modified form of transmission which is flexible from zero to any full speed ahead, and which is adapted to be used with an ordinary reversing gear to effect flexibility in reverse.

With this form of the invention, means in the nature of an automatic mechanical lock is provided for preventing an unduly heavy load from reversing the transmission. This lock sustains the entire strain of reaction in the gear train, and the speed of the driven shaft may be varied by the simple expedient of overcoming the friction on the locking gears by a very light motor mechanism transmitting but little power. In the drawings 80 represents the driven shaft carrying a slidable internal gear 81 adapted to be clutched into engagement with a gear 82 on a driven shaft 83, or to be slid into engagement with a gear 84 forming part of a conventional reverse gearing for the shaft 83.

The driven shaft 80 is integral with a gear casing 85 mounting pins 86 for a pair of bevelled idlers 87. The driving shaft 88 is connected to any suitable source of power such for instance as steam turbine or Diesel engine, and is provided with a bevelled sun gear 89 disposed within the gear case 85 and meshing with the bevelled gears 87. Gears 87 also mesh with a normally stationary sun gear 90 of bevelled form keyed to a sleeve 91 within which the shaft 88 is rotatable. Through the mechanical locking gear set which I shall later describe, the gear 90 is normally held against movement, and serves as a rack, so that when the shaft 88 is in motion, gear 89 drives the idlers 87 around the rack gear 90 carrying with them the gear casing 85 and the driven shaft 80. Thus, one half of the full speed of the driving shaft 88 is imparted to the driven shaft 80 when the gear 90 is stationary.

Fixed to the sleeve 91 is a disc 92 mounting stub shafts 93 upon which idler pinions 94 are rotatable. A second sleeve 95 rotatable on the shaft 88 abuts the sleeve 91 and carries a gear 96 disposed between and meshing with the idler pinions 94.

Pinions 94 are also in mesh with an internal gear carried by the flange 97 of a disc 98 fixed to a sleeve 99 rotatable on the sleeve 95. The relatively rotatable discs 92 and 98 together with the flange 97 cooperatively define a casing for the idler gears 94.

A stationary gear casing 100 houses oppositely facing bevelled gears 101 and 102 fixed to the sleeves 99 and 95 respectively. Spindles 103 rotatable in the gear casing 101 carry idler pinions 104 of bevelled form meshing with the bevelled gears 101 and 102.

The gear set 101, 102, 104 constitutes the mechanical lock-up which normally holds the gear 90 against rotation. The manner in which this lock-up functions may be readily traced. Assume for instance that the idlers 87 tend to rotate the gear 90 in a clockwise direction. A clockwise turning moment will be imposed on the disc 92. Through the gears 94 clockwise turning moments will likewise be imposed on the disc 98 and gear 96, and through this disc and gear on the sleeves 99 and 95 respectively. Obviously however, the bevelled pinions 104 mechanically block rotation of the gears 101 and 102 in the same direction. Since these gears are respectively fixed to the sleeves 99 and 95, the strain of reaction on the gear 90 will be transmitted directly back to the locking gears 104; it being borne in mind that the gear casing 100 is stationary.

It is to be borne in mind that the means which rotates the gear 102 in a counter-clockwise direction, need not be sufficient to overcome the strain of reaction imposed on the locking gears. The only resistance to rotation of the gear 102 in a counter clockwise direction is the friction of the locking gears which may be readily overcome. Any attempt however, to rotate the gear 102 in a clockwise direction would require considerable power, and would result in the rotating means bearing part of the burden of driving the shaft 80 through the three planetary gear sets.

The means for effecting rotation of the gear 102 to unbalance the lock includes a rotary impeller 105 fixed to the sleeve 95 and operated by impelling fluid circulated by the gear pump driven from the shaft 88.

The rotary impeller 105 is keyed to the sleeve 95 and arranged within a water-tight casing 106 provided with suitable stuffing boxes 107 around the sleeve. The casing 108 for the gear pump is provided with stuffing boxes 109 around the shaft 88. The gear pump includes a pair of gears 110, 111, the latter of which is keyed to the shaft 88.

The diagrammatic Fig. 4 best illustrates the arrangement of gear pump and impeller. From this view it will be noted that the gear pump is connected to the impeller casing by a supply pipe 112 and a return pipe 113. A by-pass pipe 114 connects the pipes 112 and 113, and a valve 115 is arranged at the intersection of the by-pass and the return pipe 113. With this valve in the position shown in Fig. 4, all of the liquid circulated by the gear pump is passing the impeller 105, so that the latter is being driven at full speed. By shifting the valve 115 through 90° however, all of the liquid will flow through the by-pass 114 and the gear pump will idle. At intermediate positions of the valve, the impeller 105 will be moved at various speeds of rotation, depending upon the extent to which the valve 115 closes or opens the by-pass.

By manipulating the valve 115, the speed of the shaft 80 may be reduced from maximum to zero. Assume for instance, that the shaft 88 is rotating at 600 R. P. M., and the shaft 80 consequently turning at 300 R. P. M. By shifting the valve 115 to a position where the rotary impeller is turning 1200 R. P. M., gear 90 will rotate at 600 R. P. M. in a direction opposite to the rotation of the gear 89 and the gears 87 will idle, imparting no motion to the shaft 80. The gear train which causes the gear 90 to rotate at 600 R. P. M. when the impeller is turning 1200 R. P. M. may be traced as follows. With the impeller turning 1200 R. P. M., similar speeds will be imparted to the gears 102 and 96 fixed to the sleeve 95 which carries the impeller. Gear 102 acting through the gears 104 will rotate the gear 101 and consequently the sleeve 99 and disc 98 at 1200 R. P. M. The internal gear of the flange 97 and the gear 96 are thus rotating at the same speed in opposite directions. Assuming that the gear 97 is thrice as large as the gear 96, the resultant motion imparted to the disc 92 and consequently the gear 90 will be at a speed of 600 R. P. M.

By virtue of this arrangement, assuming that the shaft 88 is driven at a uniform speed, and that the impeller is capable of rotating at twice the maximum speed of the shaft 88, any speed between zero and maximum may be had at the shaft 80. Since this shaft may be coupled to a reverse gearing, the above statement anent flexibility applies to both ahead and reverse movements of the driven shaft 83.

In Figs. 5 and 6 I have shown a further modified form of transmission mechanism primarily intended for use as a ship drive or in other locations where the prime mover is never uncoupled from its load.

This type of drive has much in common with the drive shown in Figs. 3 and 4 except for the fact that I have illustrated an electric motor for unbalancing the lock instead of a hydraulic impeller, and devised means which permits the entire counter shafting and lockup gear sets to be disconnected from the drive while the ship is at sea; using the counter shaft and associated gearing only when maneuvering or reversing, as when coming into port, or docking.

In this form of the invention, 120 represents a driving shaft adapted to be directly connected to a prime mover, and 121 the propeller shaft to be driven thereby. The propeller shaft is fixed to a gear casing 122 mounting idlers 123 on stub shafts 124. Idlers 123 mesh with a bevelled sun gear 125 on the shaft 120 and with a bevelled sun gear 126 fixed to a hollow driving shaft 127 adapted to be selectively locked against movement or driven from the drive shaft 120 through counter shafting which I shall later describe. Hollow shaft 127 carries a pair of lugs 128 adapted for coaction with one end of a locking lever 129. When this lever is moved to the dotted line position of Fig. 5, shaft 127 and consequently the gear 126 are locked against movement. At this time the pinions 123 travel about the gear 126 as a rack, and the propeller shaft 121 is driven by the shaft 120 at a speed equal to approximately half of the speed of the shaft 120.

A counter shaft 130 carries a gear 131 which may be driven through an idler 132 by a gear 133 slidable on the shaft 120 and operated by a clutch lever 134. When the direct drive is used as suggested above, that is to say, when the lever 129 is in locking position, the clutch is of course shifted to disengage the gear 133 from the idler 132 so that the entire counter shaft mechanism is at rest when the control motor 175 is stopped.

Counter shaft 130 carries a fixed bevelled sun gear 135 arranged in a floating gear box 136, which gear box is equipped with a stub shaft 137 carrying a gear 138 meshing with a gear 139 on the hollow shaft 127.

Counter shaft 130 is encircled by a pair of abutting sleeve members 140 and 141. The latter sleeve carries a bevelled sun gear 142 also arranged within the gear case 136. Idlers 143 in the gear case rotatable on stub shafts 144 mesh with the bevelled gears 142 and 135.

The sleeve 141 carries a disc 145 mounting idler gears 146 on the spindles 147. Arranged between these idler gears and meshing with them is a gear 148 fixed to the sleeve 140. Encircling the idler gears is a flange 149 carrying an internal gear 150. Flange 149 is integral with a disc 151 fixed upon a sleeve 152 turning on the sleeve 140.

A stationary gear case 153 mounts a pair of spindles 154 and 155 upon which idler pinions 156 and 157 are fixed. Meshing with these pinions are oppositely facing bevelled gears 158 and 159 fixed to the sleeves 152 and 140 respectively.

The spindle 154 constitutes the armature shaft of an electric motor 175.

In this form of the invention the gears 156, 157, 158 and 159 constitute the mechanical lock, which lock may be unbalanced by rotating the shaft 154 of the motor 175. Assuming that the motor is at rest, it will be apparent that the gear 142 is locked against movement, and serves as a rack; the shaft 137 being driven directly from the shaft 120 through the medium of the gears 133, 132, 131, the shaft 130, gear 135, pinions 143 and gear casing 136.

Due to the 2 to 1 ratio of gears 133 and 131, shaft 130 turns at twice the speed of the shaft 120. Due to the reduction gear 135, 143, 142, shaft 137 turns at one half of the speed of shaft 130, or in other words, at the same speed but in an opposite direction to the shaft 120. Since the gear 138 is twice as large as the gear 139, sleeve 127 will turn at twice the speed of the shaft 120 and the shaft 121 will consequently be turned in reverse.

By running the motor 175 however, to unbalance the planetary locking gears, gear 142 will be set in motion and the speed of the shafts 137 and 127 consequently reduced.

When the speed of the shaft 127 has been reduced to equal the speed of the shaft 120, gears 126 and 125 will be running at the same speeds in opposite directions, and the speed of the shaft 121 will be zero.

By further increasing the speed of the motor 175 the speed of the gear 126 may be further reduced, and the shaft 121 will run ahead.

Thus, to briefly recapitulate, with the motor 175 at rest, and the gears 132, 133 and 138, 139 in engagement, shaft 121 will be turning full speed in reverse. As the motor 175 is started and speeded up however, the reverse speed of the shaft 121 will be gradually decreased until it reaches zero, whereupon further increase in the speed of the motor 175 will cause the shaft 121 to drive ahead at a speed proportional to the speed of the motor 175.

With the arrangement of Fig. 5 therefore, the simple expedient of rotating the motor 175 to overcome the friction on the planetary locking gears, permits a wide and absolutely flexible speed range for the driven shaft 121, permitting this shaft to be driven from full speed astern to a full speed ahead.

Obviously, various changes and alterations might be made in the general form and arrangement of the parts described without departing from the invention; hence I do not wish to limit myself to the details set forth, but shall consider myself at liberty to make such changes and alterations as fairly fall within the spirit and scope of the appended claims.

I claim:

1. In a flexible mechanical power transmission a driven shaft, a motor operated driving shaft, a planetary speed reduction gear coupling the driving shaft and driven shaft, said speed reduction gear including planetary gears moving with the driven shaft, a rotating sun gear on the driving shaft and a normally stationary sun gear sustaining the reaction of the load on the driven shaft, a planetary locking gear set coupled to said normally stationary sun gear, motion transmission means operative to cooperate with said gear set to prevent rotation of the stationary sun gear under the load reaction.

2. In a flexible mechanical power transmission a driven shaft, a motor operated driving shaft, a planetary speed reduction gear coupling the driving shaft and driven shaft, said speed reduction gear including planetary gears moving with the driven shaft, a rotating sun gear on the driving shaft and a normally stationary sun gear sustaining the reaction of the load on the driven shaft, a planetary locking gear set coupled to said normally stationary sun gear, motion transmission means operative to cooperate with said gear set to prevent rotation of the gear set under the load reaction, and said last means also being operative to overcome the friction of the locking gears to permit rotation of the normally stationary sun gear.

3. In a flexible mechanical power transmission a driven shaft, a motor operated driving shaft, a planetary speed reduction gear coupling the driving shaft and driven shaft, said speed reduction gear including planetary gears moving with the driven shaft, a rotating sun gear on the driving shaft and a normally stationary sun gear sustaining the reaction of the load on the driven shaft, a planetary locking gear set coupled to said normally stationary sun gear, motion transmission means operative to cooperate with said gear set to prevent rotation of the gear set under the load reaction, and said last means also being operative to overcome the friction of the locking gears to permit rotation of the normally stationary sun gear, said last means including a motor attached to one gear of the planetary locking set.

4. In a flexible mechanical power transmission a driven shaft, a motor operated driving shaft, a planetary speed reduction gear coupling the driving shaft and driven shaft, said speed reduction gear including planetary gears moving with the driven shaft, a rotating sun gear on the driving shaft and a normally stationary sun gear sustaining the reaction of the load on the driven shaft, a planetary locking gear set coupled to said normally stationary sun gear, motion transmission means operative to cooperate with said gear set to prevent rotation of the gear set under the load reaction, and said last means also being operative to overcome the friction of the locking gears to permit rotation of the normally stationary sun gear, said last means including a motor attached to one gear of the planetary locking set and operated from the main motor shaft.

5. In a flexible mechanical power transmission a driven shaft, a motor operated driving shaft, a planetary speed reduction gear coupling the driving shaft and driven shaft, said speed reduction gear including planetary gears moving with the driven shaft, a rotating sun gear on the driving shaft and a normally stationary sun gear sustaining the reaction of the load on the driven shaft, a planetary locking gear set coupled to said normally stationary sun gear, motion transmission means operative to cooperate with said gear set to prevent rotation of the gear set under the load reaction, and said last means also being operative to overcome the friction of the locking gears to permit rotation of the normally stationary sun gear, said last means including a motor attached to one gear of the planetary locking set and operated from the main motor shaft, and capable of operating the same at a speed sufficiently great to neutralize the speed of the motor shaft sun gear and reduce the driven shaft speed to zero.

6. Power transmitting mechanism including a pair of driving shafts, means gearing them together for simultaneous turning movement at predetermined relative speeds, a driven shaft, said driven shaft operatively connected by means to the driving shafts and rotated thereby at a speed proportional to the differential speeds of the driving shafts, the means connecting the driving shafts and driven shaft including a planetary speed reduction gear, and fluid motion transmission means connected with one of said driving shafts operative to cooperate with the second mentioned means, to prevent relative retrograde rotation of said driving shafts.

7. Power transmitting mechanism including a pair of driving shafts geared together to compel simultaneous relative turning movement of the two shafts in opposite directions, a driven shaft and a planetary gear set connecting the driven shaft and the driving shafts to turn the former at a speed proportional to the difference in speeds of the driving shafts, and fluid motion transmission means connected with one of said driving shafts operative to cooperate with said planetary gear set, to prevent relative retrograde rotation of said driving shafts.

8. Power transmitting mechanism including a pair of concentric oppositely rotating driving shafts geared together in such a manner that they are free for relative rotation in one direction, a driven shaft axially aligned with the driving shafts, and a planetary gear set coupling the driving shafts and driven shaft to rotate the latter at a speed proportional to the difference in the speeds of the driving shafts, and fluid motion transmission means connected with one of said driving shafts operative to cooperate with said planetary gear set, to prevent relative retrograde rotation of said driving shafts.

9. A power and motion transmission mechanism having the combination of a freely rotatable driven element, freely rotatable pinions carried by said driven element, a freely rotatable driving element having a relatively fixed internal gear, a driving shaft having a relatively fixed external gear, said pinions being in mesh with said internal and external gears, a stationary part, freely rotatable miter gears on said stationary part, equal miter gears meshing with said first miter gears at the opposite sides of the axes thereof, said second mentioned miter gears being fixed respectively to said driving element and driving shaft.

10. A power and motion transmission mechanism having the combination of a freely rotatable driven element, freely rotatable pinions carried by said driven element, a freely rotatable driving element having a relatively fixed internal gear, a driving shaft having a relatively fixed external gear, said pinions being in mesh with said internal and external gears, a stationary part, freely rotatable miter gears on said stationary part, equal miter gears meshing with said first miter gears at the opposite sides of the axes thereof, said second mentioned miter gears being fixed respectively to said driving element and driving shaft, a second driving shaft, and driving means operatively arranged between said second driving shaft and said driven element.

11. A power and motion transmission mechanism having the combination of a driven element, a stationary part, a freely rotatable gear mounted on said part, a pair of gears meshing with said freely rotatable gear, said pair of gears being fixedly mounted respectively on driving shafts, internal and external gears respectively rotatable with said shafts, and a freely rotatable planetary pinion on said driven element which meshes with said internal and external gears, said pair of gears having similar rotative force imparted thereto by said pinion, internal and external gears and shafts, causing said pair of gears to lock with said freely rotatable gear on said stationary part, when said driven element is under the influence of a load tending to cause retrograde rotation of said driven element, thereby preventing retrograde rotation of said driven element, the reaction of the load thus being transferred to said stationary part.

12. The invention defined in claim 11, and means connected with one of said shafts to cause rotation thereof, to cause the rotation of all of said gears and the other shaft and said pinion, by merely overcoming the usual static friction between the same, for the purpose of allowing said driven element to have retrograde rotation while under the influence of the load, or direct rotation of said driven element.

Signed at New York in the county of New York and State of New York this 1st day of February, A. D. 1928.

STEPHEN A. FARRELL.